United States Patent
Bair (10) Patent No.: US 9,391,779 B2
(45) Date of Patent: Jul. 12, 2016

(54) REACTIVE BIOMETRIC SINGLE SIGN-ON UTILITY

(75) Inventor: Courtney Seth Bair, Longmont, CO (US)

(73) Assignee: International Business Machines Corporation, Armonk, NY (US)

(*) Notice: Subject to any disclaimer, the term of this patent is extended or adjusted under 35 U.S.C. 154(b) by 1361 days.

(21) Appl. No.: 12/181,187

(22) Filed: Jul. 28, 2008

(65) Prior Publication Data

US 2010/0024023 A1  Jan. 28, 2010

(51) Int. Cl.
*H04L 9/32* (2006.01)

(52) U.S. Cl.
CPC .................................. *H04L 9/3231* (2013.01)

(58) Field of Classification Search
CPC ..... H04L 9/32; H04L 9/3231; H04L 63/0428; H04L 63/126; H04L 63/062; H04L 2463/062; G06F 2221/2107; G06F 21/6227; G06F 19/322; G06F 21/6245; G06F 17/303; G06F 21/32; G06F 21/60; G06F 21/86; G06F 2201/80
USPC .............. 713/182–186; 726/5, 18–19, 27–30; 709/224–227; 340/5.82–5.83; 715/772
See application file for complete search history.

(56) References Cited

U.S. PATENT DOCUMENTS

| | | | |
|---|---|---|---|
| 6,367,017 B1 | 4/2002 | Gray | |
| 7,069,444 B2* | 6/2006 | Lowensohn et al. | 713/185 |
| 7,184,579 B2* | 2/2007 | Mizoguchi | 382/124 |
| 7,222,360 B1* | 5/2007 | Miller | 726/3 |
| 7,245,218 B2* | 7/2007 | Ikehara et al. | 340/552 |
| 7,500,262 B1* | 3/2009 | Sanin et al. | 726/2 |
| 7,770,004 B2* | 8/2010 | Herf et al. | 713/162 |
| 2003/0009562 A1* | 1/2003 | Heymann et al. | 709/227 |
| 2003/0074566 A1* | 4/2003 | Hypponen | 713/183 |
| 2003/0074590 A1* | 4/2003 | Fogle et al. | 713/320 |
| 2003/0188201 A1 | 10/2003 | Venkataramappa | |
| 2004/0059590 A1 | 3/2004 | Mercredi et al. | |
| 2004/0187029 A1* | 9/2004 | Ting | 713/201 |
| 2006/0075256 A1 | 4/2006 | Hagiwara et al. | |
| 2006/0101275 A1* | 5/2006 | Daniels et al. | 713/182 |
| 2006/0288234 A1* | 12/2006 | Azar et al. | 713/186 |
| 2007/0016958 A1* | 1/2007 | Bodepudi et al. | 726/27 |
| 2007/0174633 A1* | 7/2007 | Draper et al. | 713/186 |
| 2007/0180122 A1* | 8/2007 | Barrett | 709/227 |
| 2007/0198435 A1 | 8/2007 | Siegal et al. | |
| 2007/0240204 A1 | 10/2007 | Somekawa et al. | |
| 2008/0059804 A1* | 3/2008 | Shah et al. | 713/186 |
| 2008/0127311 A1* | 5/2008 | Yasaki et al. | 726/4 |
| 2008/0235515 A1* | 9/2008 | Yedidia et al. | 713/186 |

(Continued)

OTHER PUBLICATIONS

Beadle et al., "Location Based Personal Mobile Computing and Communication", retrieved May 19, 2008, , pp. 1-21 http://web.it.kth.se/~maguire/LocationAware/ieee_lan_98/index.html.

*Primary Examiner* — Catherine Thiaw (74) *Attorney, Agent, or Firm* — Yee & Associates, P.C.; Lisa Ulrich (57) ABSTRACT

A computer implemented method, apparatus, and computer usable program code for accessing protected resources. Biometric data for a user is received from a biometric input device and an indication of an application requiring a password. Responsive to receiving the biometric data from the user, the user is authenticated using the biometric data and a profile. Responsive to the user being authenticated, the password is established with the application to allow access to the application, wherein the password is established without user input.

20 Claims, 4 Drawing Sheets

(56) References Cited

U.S. PATENT DOCUMENTS

| | | |
|---|---|---|
| 2009/0007248 A1* | 1/2009 | Kovaleski .................... 726/8 |
| 2009/0037743 A1* | 2/2009 | Narayanaswami ........... 713/186 |
| 2009/0150551 A1* | 6/2009 | Pagan .......................... 709/228 |
| 2009/0150991 A1* | 6/2009 | Hoey et al. ................... 726/18 |
| 2009/0260010 A1* | 10/2009 | Burkhart et al. ............. 718/100 |
| 2009/0265653 A1* | 10/2009 | Sodhi et al. .................. 715/772 |
| 2009/0307693 A1* | 12/2009 | Do et al. ...................... 718/100 |
| 2011/0119756 A1* | 5/2011 | McClusky et al. ............. 726/17 |

* cited by examiner

REACTIVE BIOMETRIC SINGLE SIGN-ON UTILITY

BACKGROUND OF THE INVENTION

1. Field of the Invention

The present invention relates generally to an improved data processing system and more specifically to a method and apparatus for accessing resources. Still more particularly, the present disclosure relates to a computer implemented method, apparatus, and computer program product for accessing resources using biometric data.

2. Description of the Related Art

A password is a word or string of characters that may be entered into a computer system to login or gain access to a resource. This password may often be entered along with a user name or some other identifier. Passwords are a popular form of authentication. In other words, passwords may be used to establish or confirm that someone is authentic or the appropriate user for a particular resource. To fully secure a resource, the password must be kept secret from others that are not allowed access to the resource.

Currently, a typical user may require passwords for many different resources. Passwords may be required to login to computer accounts, retrieve email from servers, and access files, databases, networks, web sites, spreadsheets, and other resources. A password does not need to be an actual word and may be instead, some random or personal selection of characters.

With all of the different resources that may be accessed using passwords, software has been developed to help a user manage these passwords. A software manager is an application that helps a user organize passwords. This type of software typically has a database that holds password data, such as passwords and other information used to access resources. A single password referred to as a master password may be used to initiate the process to access resources using the stored passwords. These types of applications may perform automatic login scripts to interact with various resources and activate those resources for use.

While password managers provide a convenient mechanism for storing and retrieving passwords, a compromise of the master password to these types of applications might render all of the stored passwords vulnerable. Further, if the user forgets the password, the user must then remember all the passwords stored by the password manager or reset the passwords to access the different resources.

BRIEF SUMMARY OF THE INVENTION

The illustrative embodiments provide a computer implemented method, apparatus, and computer usable program code for accessing protected resources. Biometric data for a user is received from a biometric input device and an indication of an application requiring a password. Responsive to receiving the biometric data from the user, the user is authenticated using the biometric data and a profile. Responsive to the user being authenticated, the password is established with the application to allow access to the application, wherein the password is established without user input.

DETAILED DESCRIPTION OF THE INVENTION

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CDROM), an optical fiber, an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
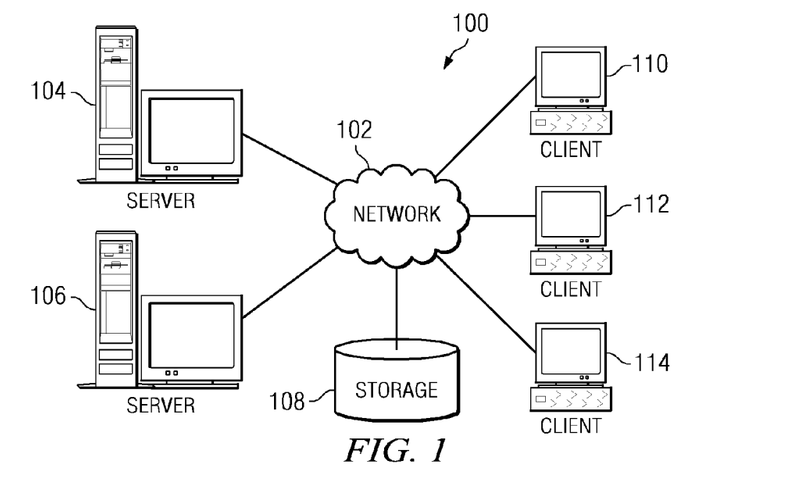
FIG. 1 is a pictorial representation of a network of data processing systems in which illustrative embodiments may be implemented.
Figure 2:
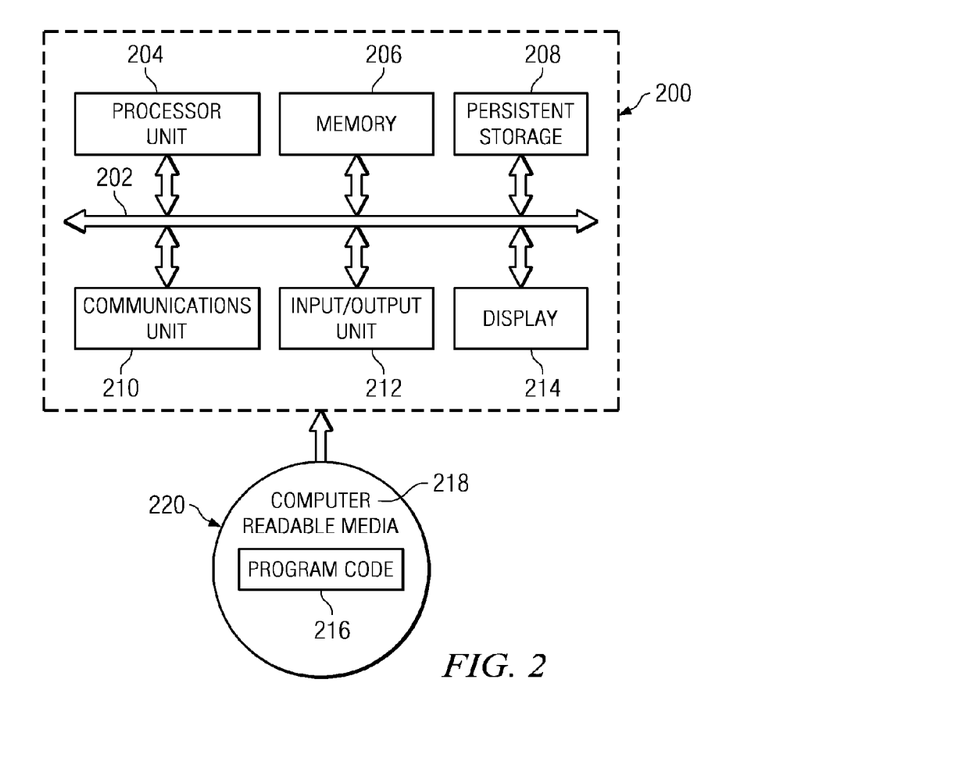
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The different illustrative embodiments provide a computer implemented method, apparatus, and computer usable program code for managing passwords. In the different illustrative examples, biometric data may be received for a user from a biometric input device. In response to receiving the biometric data, a determination may be made as to whether the biometric data for the user matches a profile in a database of access information. In response to the biometric data matching the profile, access information for a protected resource is identified to form identified access information. The protected resource is activated using the identified access information. In these different illustrative examples, a protected resource is a resource that requires access information to be used. A protected resource may be, for example, without limitation, a database, a network, a web site, a document, a web service, an account, a spreadsheet, or some other suitable resource.

Further, the process may monitor a computer at which the user is located for a presence of the user. In response to an absence of the user for more than a selected period of time, the process prevents access to the protected resource. The illustrative embodiments also may generate a password for the protected resource in response to a need for a password for the protected resource. In this manner, the user may be prevented from knowing the password for the protected resource. The different illustrative embodiments may generate and store passwords with the user only needing to provide biometric data to activate different protected resources. Using the different illustrative embodiments, a single sign-on may be provided for accessing multiple protected resources.

Figure 3:
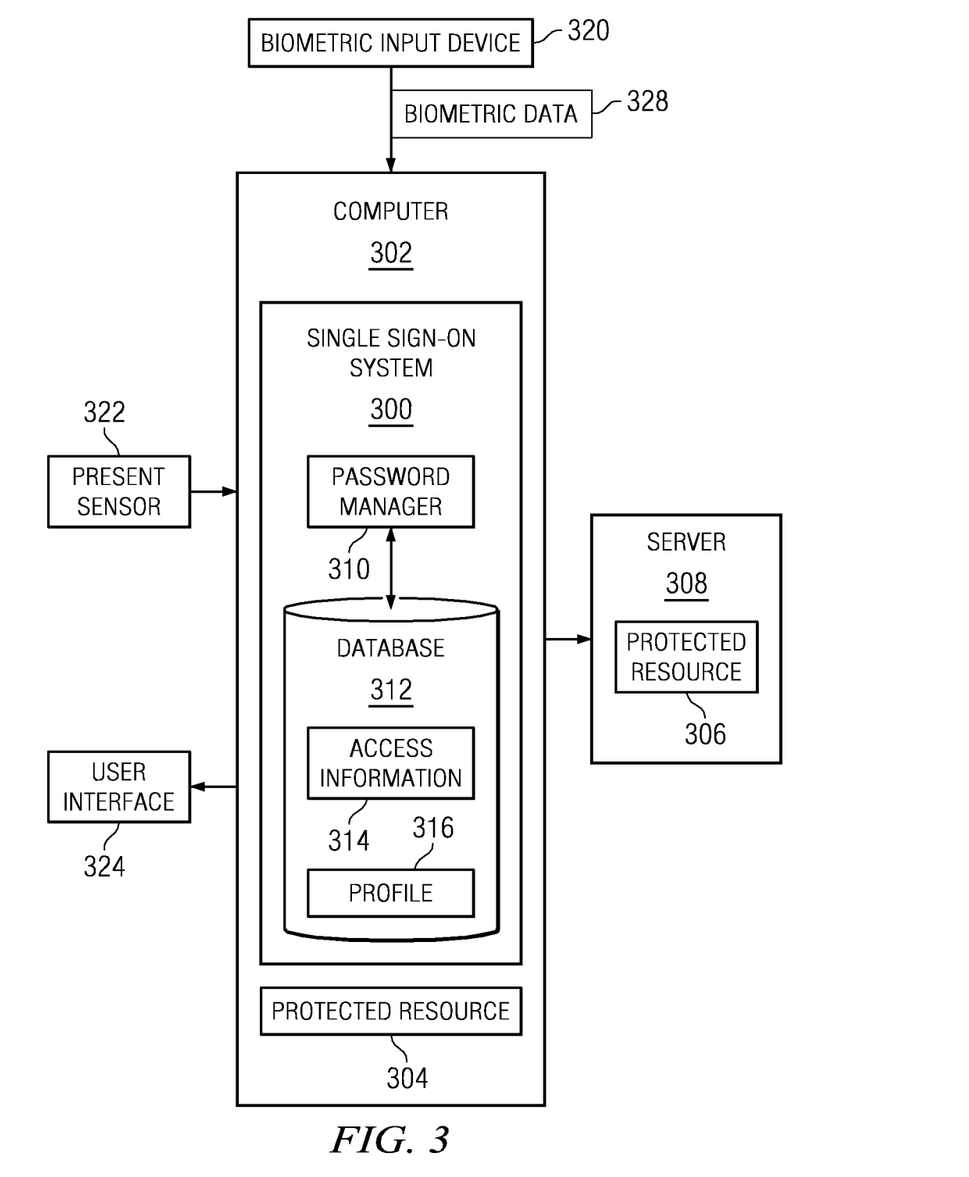
FIG. 3 is a block diagram illustrating data flow for managing passwords in accessing resources in accordance with an illustrative embodiment.

With reference now to FIG. 3, a block diagram illustrating data flow for managing passwords in accessing resources is depicted in accordance with an illustrative embodiment. In this illustrative example, single sign-on system 300 may execute on computer 302. Computer 302 may be implemented using a data processing system such as, for example, data processing system 200 in FIG. 2. Single sign-on system 300 may be used to access different protected resources such as, for example, protected resource 304 on computer 302 or protected resource 306 on server 308.

In this illustrative example, single sign-on system 300 includes password manager 310 and database 312. Password manager 310 contains the processes necessary to activate a protected resource such as, for example, protected resource 304 and protected resource 306.

In these different examples, single sign-on system 300 and password manager 310 protect users from compromise of their passwords and/or pass codes. Currently, various mechanisms may compromise passwords and/or pass codes. These mechanisms include, for example, without limitation, key loggers, key ghosts, trojan viruses, shared passwords, passwords written on post-it notes, passwords easily identifiable due to their personal and familiar nature, nosy neighbors, and coercion.

In these different illustrative examples, activating a protected resource means performing the necessary operations and/or steps to place the protected resource in a state for access and/or manipulation by a user. Database 312 includes access information 314, which may be used to activate a protected resource such as protected resource 304 and/or protected resource 306. In these examples, a database is a collection of records and/or data. A database may take various forms including, for example, without limitation, a table, a flat file, or some other data structure. Database 312 may be itself encrypted so that it is encrypted when not in use or timed out, when deactivated by the user, and when the power is shut down, and it is decrypted when in use and unlocked by biometric data of the user.

Access information 314 contains information to access a set of protected resources. A set as used herein refers to one or more items. For example, a set of protected resources is one or more protected resources. Access information 314 contains all of the information needed to access a particular protected resource. This access information may include at a minimum, a password. In other illustrative examples, access information 314 also may include user identification, a password, and other suitable information for using and accessing protected resources.

For example, if protected resource 304 is a document, password manager 310 may obtain access information 314 and perform steps needed to open protected resource 304 using a word processor. As part of this process, the word processor requests a password to open protected resource 304. Password manager 310 supplies access information 314 to open the document. In this example, only the password is present within access information 314 for protected resource 304.

In yet another example, if protected resource 306 is a web site on server 308, password manager 310 obtains access information 314 from database 312 in the form of a password and user identifier. Password manager 310 may activate protected resource 306 by sending a universal resource locator for a login page for protected resource 306 to server 308. Password manager 310 may then enter the user identifier and password in access information 314 in the appropriate fields in the login web page. In this manner, password manager 310 performs the steps needed to activate protected resource 306 when protected resource 306 takes the form of a web site. This process establishes access to protected resource 306 for the user.

Additionally, password manager 310 also may establish access information for a user. For example, password manager 310 may use profile 316 to generate access information 314. Profile 316 includes any information needed to establish access information 314. For example, if protected resource 306 is an account on server 308, establishing a password may require information, including, for example, a user identifier, an email address, a challenge question, a challenge answer, and a proposed password. Profile 316 may contain this information. Password manager 310 performs the steps needed to send the information in profile 316 to protected resource 306 to establish access information 314. Further, password manager 310 automatically generates the appropriate password to access protected resource 306 and stores the password in access information 314. With single sign-on system 300, the user may never know the password and only needs to sign-on once with password manager 310 in single sign-on system 300.

In these examples, a user may sign-on to single sign-on system 300. The user may sign-on once to single sign-on system 300 to access more than one protected resource without having to re-sign-on or authenticate. A user may send biometric data 328 to single sign-on system 300 using biometric input device 320. Biometric input device 320 may take various forms. For example, biometric input device 320 may be, for example, a fingerprint reader, a retina scanner, a facial recognition system, or some other suitable device.

Biometric data 328 is compared with profile 316 to determine whether the user is the appropriate or correct user for single sign-on system 300. In other words, biometric data 328 and profile 316 are used to authenticate the user. In these examples, profile 316 may include the comparison information or biometric data for comparison with biometric data 328. Of course, profile 316 may contain information for multiple users depending on the particular implementation. If biometric data 328 matches profile 316, single sign-on system 300 automatically obtains access information 314 and activates a set of protected resources.

Thus, after identifying a protected resource, access information, such as an account and a password, may be established without user input. After the user has been authenticated and identifies the protected resource, password manager 310 interacts with the protected resource to provide the user access to the protected resource. This interaction includes establishing a password and/or an account. The user does not need to generate or even see the password, in these examples.

An additional feature that may be provided by single sign-on system 300 is a capability to monitor for a presence of a user. Password manager 310 may determine whether the user is present using presence sensor 322. Presence sensor 322 may be, for example, a keyboard, a motion detector, a camera, or some other suitable presence sensor. In the example of the keyboard, the presence of the user may be detected based on key strokes being performed by the user. Further, the presence of the user may be, for example, without limitation, detected by infrared detectors when the presence sensor is a motion detector or by pixel changes when the presence sensor is a camera.

In other illustrative examples, a more sophisticated system may be used to ensure that the user at computer 302 is the same user in profile 316. If the user is absent for more than a selected threshold amount of time, password manager 310 prevents access to the protected resource by, for example, without limitation, locking the computer screen.

The preventing of access to the protected resource may include, for example, locking computer 302 and/or deactivating the protected resource. The threshold set may depend on the particular implementation. For example, if a keyboard is used as presence sensor 322, the threshold may be some selected amount of time as desired by the user. If presence sensor 322 takes the form of a facial recognition system, password manager 310 may prevent access to the protected resource as soon as the user is no longer detected as being present at computer 302.

In the different illustrative embodiments, each time a user requests to access another protected resource during the same session, no additional biometric data other than the initial input to biometric input device 320 at the start of the session is needed. In these illustrative embodiments, password manager 310 may activate the new protected resource as long as the user is still detected as being present at computer 302.

The illustration of single sign-on system 300 in FIG. 3 is provided for purposes of depicting some features of the illustrative embodiments and is not meant to imply physical or architectural limitations to the manner in which different illustrative embodiments may be implemented. For example, in some illustrative embodiments biometric device 322 may be located at a computer remote to computer 302. In other words, the user may be located at a remote computer containing biometric device 320 with the biometric data 328 being sent across a communication link to computer 302 to activate the protected resource. In this example, computer 302 may be a server with biometric input device 320 located at a client computer. In yet other advantageous embodiments, database 312 may be located at a computer in a remote location to the computer on which the password manager 310 is located.

In these examples, when passwords are generated, those passwords are returned to password manager 310 and stored in database 312 instead of being sent to the user of single sign-on system 300. The user never needs to see or know the passwords for the different protected resources being accessed by the user. Instead, the only action needed by the user is to supply biometric data 328 to authenticate the user with single sign-on system 300. In this manner, a more secure management of passwords and other access information may be performed. The user cannot accidently provide that information to unauthorized persons.

For example, if a key logging program is present on computer 302, a key logging program cannot identify passwords because the user never has to enter the password and never receives the password. Further, with the use of biometric data 328 a user does not have to remember a password or pass code. In the event of a password or pass code expiring for a protected resource, it may be a trivial matter for the user to utilize a password manager utility with the purpose of generating a new password, with the new password remaining unknown to the user.

Further, the user may interact with single sign-on system 300 through user interface 324. User interface 324 provides a user a capability to perform various actions. These actions include, for example, selecting a particular or protected resource for access, adding protected resources, deleting protected resources, and/or performing other actions.

Figures 4, 5:
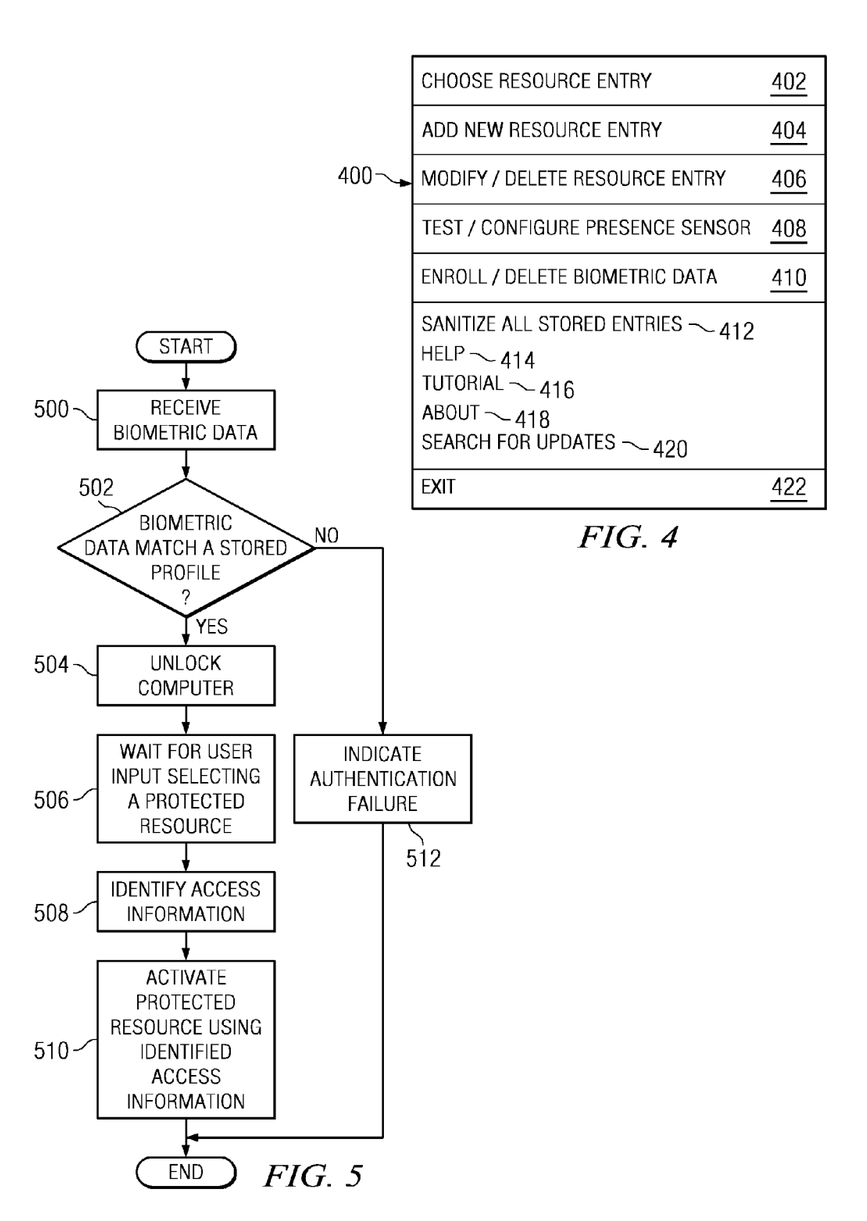
FIG. 4 is an illustration of a menu in a user interface in accordance with an illustrative embodiment.
FIG. 5 is a flowchart of a process for accessing protected resources in accordance with an illustrative embodiment.

With reference now to FIG. 4, an illustration of a menu in a user interface is depicted in accordance with an illustrative embodiment. In this example, menu 400 is an example of a menu that may be presented in user interface 324 in FIG. 3. Menu 400 may allow a user to perform various actions. In this example, menu 400 includes entries 402, 404, 406, 408, 410, 412, 414, 416, 418, and 420.

Entry 402 allows the user to select a protected resource for activation. Entry 404 may allow the user to add a new protected resource. Entry 406 allows the user to make modifications or delete a protected resource from a single sign-on system such as, for example, single sign-on system 300 in FIG. 3. Entry 408 allows the user to test or configure a presence sensor. Entry 410 allows the user to generate a profile or delete biometric data for the user.

Entry 412 allows a user to delete all entries from a single sign-on system. Entry 414 may allow the user to obtain help information. Entry 416 may present a tutorial to show the user how to use the single sign-on system. Entry 418 may provide information about the single sign-on system. Entry 420 may allow the user to search for updates to the single sign-on system. Entry 422 allows the user to exit from menu 400. Menu 400 may be displayed in a tray on a task bar. Of course, menu system 400 may be presented or activated in other ways. For example, menu 400 may be displayed when the user right clicks a mouse or presses a particular control key.

With reference now to FIG. 5, a flowchart of a process for accessing protected resources is depicted in accordance with an illustrative embodiment. The process illustrated in FIG. 5 may be implemented in a software component such as, for example, password manager 310 in FIG. 3.

The process begins by receiving biometric data (step 500). This biometric data may be received through a biometric input device connected to the computer at which the user may be located. The process then determines whether the biometric data matches a stored profile (step 502). The process makes this determination to authenticate the user with the biometric data. If the biometric data matches the stored profile, the process unlocks the computer (step 504). The process then waits for a user input selecting a protected resource (step 506). When a protected resource is selected for use, the process identifies access information associated with the protected resource (step 508). This access information may include, for example, without limitation, a user identifier, a password, and other suitable information needed to access the protected resource.

The process then activates the protected resource using the identified access information (step 510) with the process terminating thereafter. In step 510, the process performs various operations or steps needed to place the protected resource in a state for use by the user. These steps may include, for example, activating an application associated with the protected resource, obtaining a web page to login to an account, or some other suitable set of actions.

With reference again to step 502, if the biometric data does not match a stored profile, the process indicates an authentication failure (step 512) with the process terminating thereafter. In these examples, step 504 may be an optional step. In some embodiments, the computer may be unlocked for use without requiring biometric data, but activation of a protected resource does not occur unless biometric data is supplied that matches a stored profile containing authorization to access that particular protected resource.

Figure 6:
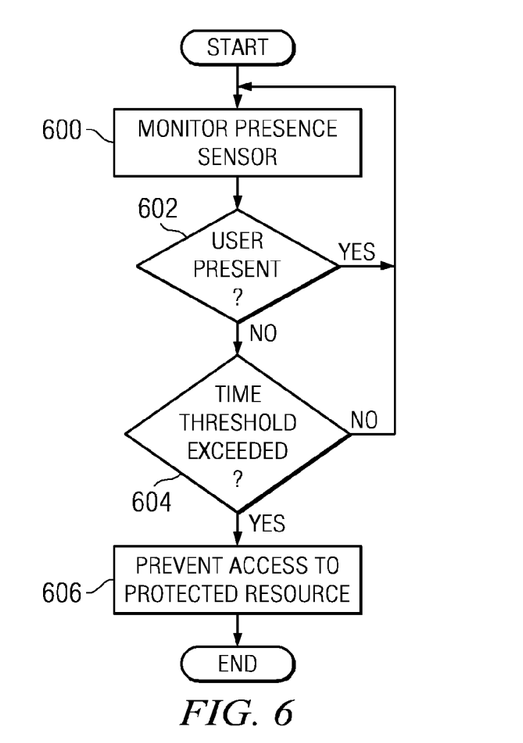
FIG. 6 is a flowchart of a process for automatically preventing access to a protected resource in accordance with an illustrative embodiment.

With reference now to FIG. 6, a flowchart of a process for automatically preventing access to a protected resource is depicted in accordance with an illustrative embodiment. The process illustrated in FIG. 6 may be implemented in a software component such as, for example, password manager 310 in FIG. 3.

The process begins by monitoring a presence sensor (step 600). This presence sensor is monitored to obtain data used to determine whether the user is present at the computer. The process determines whether the user is present at the computer (step 602). If the user is present, the process returns to step 600. Otherwise, the process determines whether a time threshold has been exceeded (step 604). This time threshold may be preset or selected by the user depending on the particular implementation. For example, the time threshold may be five minutes, ten minutes, thirty minutes, or some other suitable amount of time. In some illustrative embodiments, the time threshold may be zero. In other words, if the user leaves the computer, access to the protected resource is prevented.

If the time threshold is not exceeded, the process returns to step 600. If the time threshold is exceeded, the process prevents access to the protected resource (step 606) with the process terminating thereafter. Step 606 may include various actions. For example, access to the protected resource may be prevented by locking the computer and/or blanking the display. In other illustrative examples, access to the protected resource may be prevented by deactivating or closing the protected resource.

Figure 7:
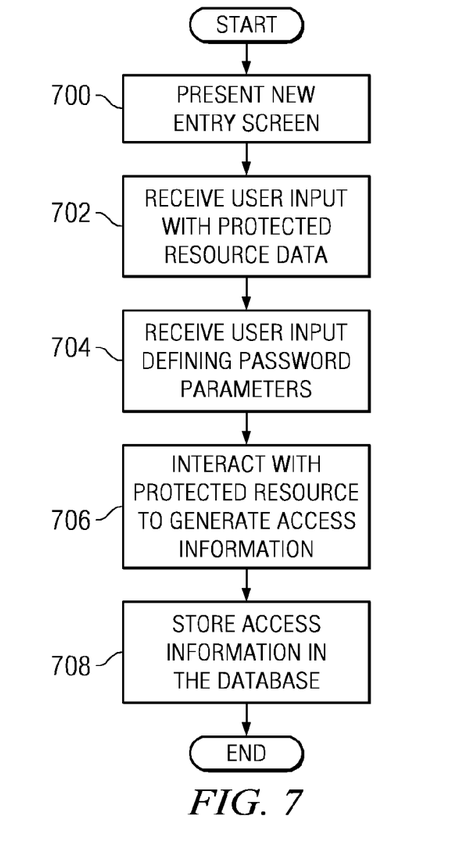
FIG. 7 is a flowchart of a process for adding a protected resource to a single sign-on system in accordance with an illustrative embodiment.

With reference now to FIG. 7, a flowchart of a process for adding a protected resource to a single sign-on system. The process illustrated in FIG. 7 may be implemented in a software component such as, for example, password manager 310 in FIG. 3. This process may be initiated using user interface 324 and selecting entry 404 in FIG. 4.

The process begins by presenting a new entry screen (step 700). This screen provides fields for a user to enter information for adding a new protected resource. The process receives user input with protected resource data (step 702). This protected resource data may include, for example, an identification of the resource. The resource identification may be, for example, a universal resource locator for the resource, an identification of an application, an identification of a file, or some other suitable identifier. This protected resource data also may include a login identifier, and other information needed to establish access to the protected resource. For example, a challenge question and a challenge answer also may be received in step 702.

The process then receives user input defining password parameters (step 704). These parameters may include, for example, a password length, whether the password can begin with a number, whether a non alphabetical character is required, whether a number is required, whether punctuation or special characters are required, whether upper and lower case characters are required, and other suitable parameters for generating a password. The process then interacts with the protected resource to generate the access information (step 706). The process then stores the access information in the database (step 708) with the process terminating thereafter. This process does not require the user to enter or know the password for the protected resource. Instead, the process generates the password automatically and stores the password based on the constraints or parameters entered by the user.

Thus, the different illustrative embodiments provide a computer implemented method, apparatus, and computer usable program code for accessing protected resources. In the different examples, biometric data may be received for a user from a biometric input device. In response to receiving the biometric data, a determination is made as to whether the biometric data for the user matches a profile in a set of profiles. Access information is identified for the protected resource stored in the data base if the biometric data matches the profile. The protected resource may be activated using this identified access information. Further, the computer at which the user is located may be monitored for the presence of the user. If the user is absent for more than a selected period of time, access to the protected resource may be prevented as a further security measure.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for accessing a protected resource, the method comprising:
   a computer determining whether a sample of biometric data received from a biometric input device matches predetermined biometric information for a user;

responsive to a determination that the sample of biometric data received from the biometric input device matches the predetermined biometric information for the user, and responsive to the computer receiving a request to access the protected resource, wherein the request includes an identification of the protected resource in a plurality of protected resources, the computer providing access to the user to the protected resource, and wherein the user has access to more than one protected resource without having to re-sign-on or authenticate;

responsive to a determination that a need exists to generate a password for the user to access the protected resource, the computer generating the password for the user to access the protected resource by:
  the computer communicating with the protected resource to establish the password based on password requirements for the protected resource; and
  the computer generating the password for the user to access the protected resource based on the password requirements for the protected resource;

the computer monitoring a presence sensor to determine whether the user is present at the computer, wherein the presence sensor is one of a set of presence sensors including a keyboard, a motion detector, a camera, and a facial recognition system;

responsive to a determination that the user is present at the computer, the computer returning to monitoring the presence sensor, wherein the user is permitted one of continued access to the protected resource or initial access to a requested new protected resource;

responsive to a determination that the user is not at the computer, the computer determining whether a time threshold has been exceeded, wherein the time threshold is one of a predetermined value and a value selectable by the user and is associated with a particular presence sensor used;

responsive to a determination that the time threshold is not exceeded for the particular presence sensor, the computer returning to monitoring the presence sensor;

responsive to a determination that the time threshold is exceeded for the particular presence sensor, the computer preventing access to the protected resource; and the computer storing the predetermined biometric information for the user and the password for the user to access the protected resource in a profile for the user in a database, wherein the database is encrypted when not in use, when timed out, when deactivated by the user, and when power is shut down, and wherein the database is decrypted when in use and when unlocked using biometric data received for the user.

2. The method of claim 1, wherein the computer preventing access to the protected resource comprises:
  the computer locking a user interface of the computer.

3. The method of claim 1, wherein the computer preventing access to the protected resource comprises:
  the computer encrypting information in a database including access information, used to activate the protected resource.

4. The method of claim 1 further comprising:
  the computer unlocking a user interface of the computer responsive to the determination that the sample of biometric data received from the biometric input device matches the predetermined biometric information for the user.

5. The method of claim 1, wherein the protected resource is a first protected resource in the plurality of protected resources, and further comprising:
  responsive to a request to access a second protected resource in the plurality of protected resources while a presence of the user is detected, the computer providing access to the user to the second protected resource.

6. The method of claim 1, wherein the computer determining whether the sample of biometric data received from the biometric input device matches the predetermined biometric information for the user, the computer determining the user is not at the computer, and the computer determining whether a predetermined time threshold has been exceeded are executed on a computer system selected from one of a selected computer system at which the user is located and a remote computer system to the selected computer system at which the user is located.

7. The method of claim 1, wherein the biometric input device is a camera, and wherein the computer determining whether the sample of biometric data received from the biometric input device matches the predetermined biometric information for the user comprises:
  the computer using the facial recognition system to process the sample of biometric data from the camera, the sample of biometric data retrieved from the camera comprising a set of biometric data for a feature of the user that is generated by the camera;
  the computer determining that the sample of biometric data processed matches the predetermined biometric information for the user; and
  the computer determining the user is present at the computer based on a match between the sample of biometric data processed and the predetermined biometric information for the user.

8. The method of claim 1, wherein the protected resource is an encrypted database, the encrypted database is decrypted using the predetermined biometric information for the user, and the biometric input device is selected from one of a fingerprint reader, a retina scanner, and the facial recognition system, and further comprising:
  responsive to the determination that the sample of biometric data received from the biometric input device matches the predetermined biometric information for the user, the computer identifying a start of a single sign-on session and the computer providing the access to the user to the protected resource during the single sign-on session without requiring the user to enter a password.

9. A computer program product for accessing a protected resource, the computer program product comprising:
  a computer-readable, tangible storage device;
  program code, stored on the computer-readable, tangible storage device, for execution by a computer the program code comprising:
  program code, stored on the computer-readable, tangible storage device, to determine whether a sample of biometric data received from a biometric input device matches predetermined biometric information for a user;
  program code, stored on the computer-readable, tangible storage device, to provide access to the user to the protected resource in response to a determination that the sample of biometric data received from the biometric input device matches the predetermined biometric information for the user, and in response to receiving a request to access the protected resource, wherein the request includes an identification of the protected resource in a plurality of protected resources, and wherein the user has access to more than one protected resource without having to re-sign-on or authenticate;

program code, stored on the computer-readable, tangible storage device, in response to a determination that a need exists to generate a password for the user to access the protected resource, to generate the password for the user to access the protected resource by:
  program code, stored on the computer-readable, tangible storage device, to communicate with the protected resource to establish the password based on password requirements for the protected resource; and
  program code, stored on the computer-readable, tangible storage device, to generate the password for the user to access the protected resource based on the password requirements for the protected resource;
program code, stored on the computer-readable, tangible storage device, to monitor a presence sensor to determine whether the user is present at the computer, wherein the presence sensor is one of a set of presence sensors including a keyboard, a motion detector, a camera, and a facial recognition system;
program code, stored on the computer-readable, tangible storage device, in response to a determination that the user is present at the computer, to return to monitoring the presence sensor, wherein the user is permitted one of continued access to the protected resource or initial access to a requested new protected resource;
program code, stored on the computer-readable, tangible storage device, in response to a determination that the user is not at the computer, to determine whether a time threshold has been exceeded, wherein the time threshold is one of a predetermined value and a value selectable by the user and associated with a particular presence sensor used;
program code, stored on the computer-readable, tangible storage device, in response to a determination that the time threshold is not exceeded for the particular presence sensor, to return to monitoring the presence sensor;
program code, stored on the computer-readable, tangible storage device, in response to a determination that the time threshold is exceeded for the particular presence sensor, to prevent access to the protected resource; and
program code, stored on the computer-readable, tangible storage device, to store the predetermined biometric information for the user and the password for the user to access the protected resource in a profile for the user in a database, wherein the database is encrypted when not in use, when timed out, when deactivated by the user, and when power is shut down, and wherein the database is decrypted when in use and when unlocked using biometric data received for the user.

10. The computer program product of claim 9 further comprising:
  program code, stored on the computer-readable, tangible storage device, to unlock a user interface of the computer in response to the determination that the sample of biometric data received from the biometric input device matches the predetermined biometric information for the user.

11. The computer program product of claim 9, wherein the biometric input device is a camera, and wherein the program code, stored on the computer-readable, tangible storage device, to determine whether the sample of biometric data received from the biometric input device matches the predetermined biometric information for the user comprises:
  program code, stored on the computer-readable, tangible storage device, to use the facial recognition system to process the sample of biometric data from the camera, the sample of biometric data retrieved from the camera comprising a set of biometric data for a feature of the user that is generated by the camera;
  program code, stored on the computer-readable, tangible storage device, to determine that the sample of biometric data processed matches the predetermined biometric information for the user; and
  program code, stored on the computer-readable, tangible storage device, to determine the user is present at a computer based on a match between the sample of biometric data processed and the predetermined biometric information for the user.

12. The computer program product of claim 9, wherein the protected resource is an encrypted database, the encrypted database is decrypted using the predetermined biometric information for the user, and the biometric input device is selected from one of a fingerprint reader, a retina scanner, and the facial recognition system, and further comprising:
  program code, stored on the computer-readable, tangible storage device, to identify a start of a single sign-on session and provide the access to the user to the protected resource during the single sign-on session without requiring the user to enter a password.

13. A computer comprising:
  a processor unit, a computer-readable, tangible storage device, and a memory having program code, stored thereon for execution by the processor unit, the program code comprising:
  program code for determining whether a sample of biometric data received from a biometric input device matches predetermined biometric information for a user;
  program code for providing access to the user to a protected resource in response to a determination that the sample of biometric data received from the biometric input device matches the predetermined biometric information for the user, and in response to receiving a request to access the protected resource, and wherein the request includes an identification of the protected resource in a plurality of protected resources, and wherein the user has access to more than one protected resource without having to re-sign-on or authenticate;
  program code, in response to a determination that a need exists to generate a password for the user to access the protected resource, for generating the password for the user to access the protected resource by:
    program code for communicating with the protected resource to establish the password based on password requirements for the protected resource; and
    program code for generating the password for the user to access the protected resource based on the password requirements for the protected resource;
  program code for monitoring a presence sensor to determine whether the user is present at the computer, wherein the presence sensor is one of a set of presence sensors including a keyboard, a motion detector, a camera, and a facial recognition system;
  program code in response to a determination that the user is present at the computer, for returning to monitoring the presence sensor, wherein the user is permitted one of continued access to the protected resource or initial access to a requested new protected resource;
  program code in response to a determination that the user is not at the computer, for determining whether a time threshold has been exceeded, wherein the time threshold is one of a predetermined value and a value selectable by the user and is associated with a particular presence sensor used;

program code in response to a determination that the time threshold is not exceeded for the particular presence sensor, for returning to monitoring the presence sensor;

program code in response to a determination that the time threshold is exceeded for the particular presence sensor, for preventing access to the protected resource; and program code for storing the predetermined biometric information for the user and the password for the user to access the protected resource in a profile for the user in a database, wherein the database is encrypted when not in use, when timed out, when deactivated by the user, and when power is shut down, and wherein the database is decrypted when in use and when unlocked using biometric data received for the user.

14. The data processing system of claim 13 further comprising:

program code for unlocking a user interface of the computer in response to the determination that the sample of biometric data received from the biometric input device matches the predetermined biometric information for the user.

15. The data processing system of claim 13, wherein the biometric input device is a camera, and wherein the program code for determining whether the sample of biometric data received from the biometric input device matches the predetermined biometric information for the user comprises:

program code for using a facial recognition system to process the sample of biometric data from the camera, the sample of biometric data retrieved from the camera comprising a set of biometric data for a feature of the user that is generated by the camera;

program code for determining that the sample of biometric data processed matches the predetermined biometric information for the user; and program code for determining the user is present at a computer based on a match between the sample of biometric data processed and the predetermined biometric information for the user.

16. The data processing system of claim 13, wherein the protected resource is an encrypted database, the encrypted database is decrypted using the predetermined biometric information for the user, and the biometric input device is selected from one of a fingerprint reader, a retina scanner, and the facial recognition system, and further comprising:

program code for identifying a start of a single sign-on session and providing the access to the user to the protected resource during the single sign-on session without requiring the user to enter a password.

17. A method for accessing a protected resource, the method comprising:

a computer determining whether a sample of a biometric feature received from a biometric input device matches predetermined biometric information for a user;

responsive to a determination that the sample of the biometric feature received from the biometric input device matches the predetermined biometric information for the user, and responsive to the computer receiving a request to access the protected resource, wherein the request includes an identification of the protected resource in a plurality of protected resources, the computer providing access to the user to the protected resource, and wherein the user has access to more than one protected resource without having to re-sign-on or authenticate;

responsive to a determination that a need exists to generate a password for the user to access the protected resource, the computer generating the password for the user to access the protected resource by:

the computer communicating with the protected resource to establish the password based on password requirements for the protected resource; and the computer generating the password for the user to access the protected resource based on the password requirements for the protected resource;

the computer monitoring a presence sensor to determine whether the user is present at the computer, wherein the presence sensor is one of a set of presence sensors including a keyboard, a motion detector, a camera, and a facial recognition system;

responsive to a determination that the user is present at the computer, the computer returning to monitoring the presence sensor, wherein the user is permitted one of continued access to the protected resource or initial access to a requested new protected resource;

responsive to a determination that the user is not at the computer, the computer determining whether a time threshold has been exceeded, wherein the time threshold is one of a predetermined value and a value selectable by the user and is associated with a particular presence sensor used;

responsive to a determination that the time threshold is not exceeded for the particular presence sensor, the computer returning to monitoring the presence sensor;

responsive to a determination that the time threshold is exceeded for the particular presence sensor, the computer preventing access to the protected resource; and the computer storing the predetermined biometric information for the user and the password for the user to access the protected resource in a profile for the user in a database, and wherein the database is encrypted when not in use, when timed out, when deactivated by the user, and when power is shut down, and wherein the database is decrypted when in use and when unlocked using biometric data received for the user.

18. The method of claim 17 further comprising:

unlocking a user interface of the computer in response to the determination that the sample of the biometric feature received from the biometric input device matches the predetermined biometric information for the user.

19. The method of claim 17, wherein the biometric input device is a camera, and wherein the computer determining whether the sample of the biometric feature received from the biometric input device matches the predetermined biometric information for the user comprises:

the computer using a facial recognition system to process the sample of the biometric feature from the camera, the biometric feature retrieved from the camera comprising a set of biometric data for the user that is generated by the camera;

the computer determining that the sample of the biometric feature processed matches the predetermined biometric information for the user; and the computer determining the user is present at the computer based on a match between the sample of the biometric feature processed and the predetermined biometric information for the user.

20. The method of claim 17, wherein the protected resource is an encrypted database, the encrypted database is decrypted using the predetermined biometric information for the user, and the biometric input device is selected from one of a fingerprint reader, a retina scanner, and the facial recognition system, and further comprising:

responsive to the determination that the sample of the biometric feature received from the biometric input device matches the predetermined biometric information for the user, the computer identifying a start of a single sign-on session and the computer providing the access to the user to the protected resource during the single sign-on session without requiring the user to enter a password.

* * * * *